April 5, 1927.

W. A. PEARSALL, JR 1,623,131

RUNNING BOARD LAMP

Filed May 21, 1925

Inventor.
William A. Pearsall, Jr.
By
Atty.

Patented Apr. 5, 1927.

1,623,131

UNITED STATES PATENT OFFICE.

WILLIAM A. PEARSALL, JR., OF DETROIT, MICHIGAN.

RUNNING-BOARD LAMP.

Application filed May 21, 1925. Serial No. 31,735.

This invention relates to lamps particularly adapted as attachments for running boards of automobiles.

The principal object of my invention is to provide lamps with casings projecting above the running boards of the car and having light emitting openings facing forward, rearward, upward, and laterally outward to make the sides of the car visible at night to vehicles approaching from opposite directions, when passing and when turning corners or curves in the roadway to lessen accidents.

The invention consists further in the matters hereinafter described and claimed.

In the accompanying drawings—

Figure 1:
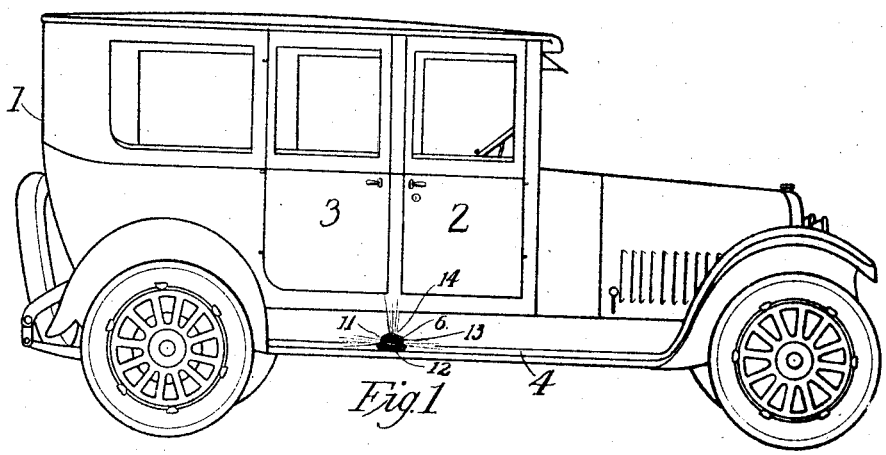
Fig. 1 is a side view of an automobile showing a lamp of my invention on the running-board thereof.

In the drawings, 1 indicates the body of an automobile, 2, 3 the front and rear doors at one side thereof and 4 the running board, as usual in automobile design. A lamp of my invention is mounted on the upper side of said running-board, preferably between the doors 2, 3, as shown. The equipment for a car may include two such lamps, one on each side of the machine so as to illuminate both sides thereof in accordance with my invention.

Figure 2:
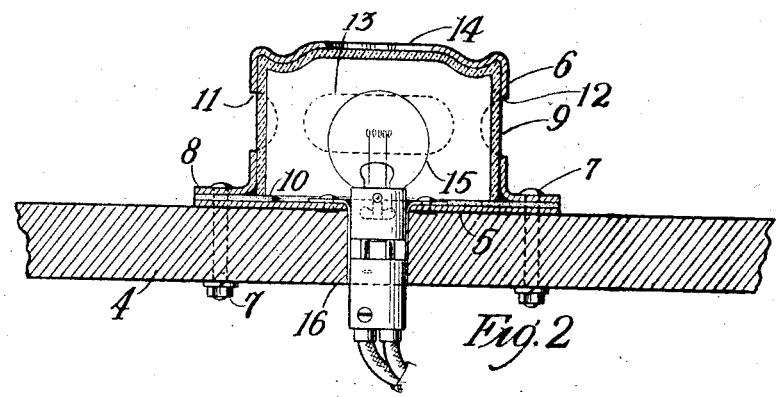
Fig. 2 is an enlarged vertical sectional view on line 2—2 of Fig. 3.
Figure 3:
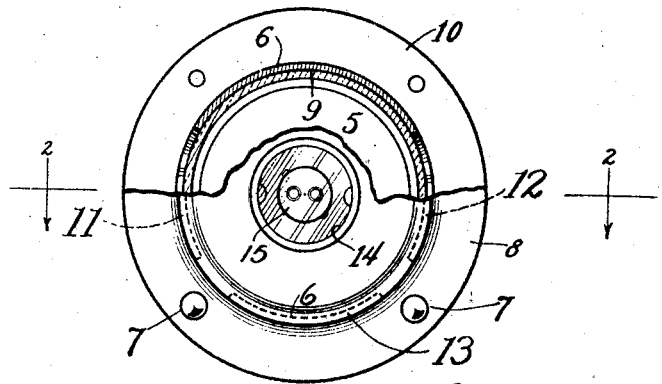
Fig. 3 is a top plan view of the lamp with parts broken away and in section.

The lamp has a flat base plate 5 and a hollow metal casing or cage 6 in the shape of an inverted cup and secured to the upper side of the running-board 4 by bolts or screws 7 passing through the base plate 5 and a marginal flange 8 around the lower edge of the casing 6, as shown in Figs. 2 and 3.

Fitting in the casing 6 is an inverted globe 9 of glass or other light-transmitting material. The globe 9 seats on a cork or other gasket 10 around the bottom edge of the casing 6 and clamped between the same and the base plate 5 by the bolts 7, as shown in Fig. 2.

Said casing 6 projects above the board 4 and has a plurality of horizontally disposed elongated openings 11, 12 and 13 in its surrounding upright marginal wall and a single opening 14 in its top wall, as shown in the drawings. The base plate 5 has its upper surface polished or finished to form a reflector for the electric light 15 within the globe 9 and carried by a terminal socket 16 fitted to the base plate 5 and extending downward therefrom through the board 4, as shown in Fig. 2.

The lamp is mounted on the board 4 with its openings 11, 12 facing to the front and rear, respectively, of the car and with its opening 13 facing laterally outward from the side of the car, as shown. At night when the lamp is lit, the front and rear openings 11 and 12 allow light rays to be projected along the board 4 to the front and to the rear of the car, while the side opening 13 allows light rays to be projected laterally outward from the car, thus making visible the side of the car for vehicles coming from all directions and more particularly when turning corners. The lamp also illuminates the board 4 at the doors 2, 3 and makes it visible for persons on entering as well as leaving the car.

The top opening 14 allows light rays to be projected vertically upward along the side of the car to show the handles of the doors when dark and also to light up the key opening of the door lock. In addition, this upward beam of light shows the hand of the driver when extended outward from the side of the car to indicate a stop or turn.

The casing 6 houses the glass 9 and protects it from being scratched or broken when the lamps happen to be struck by moving articles into or out of the car or along the board or when stepped on by a person getting into or out of the car or when moving along said board. The shape of the casing allows it to be readily stamped from sheet metal of a gauge to give it the strength required, thus cheapening the cost of making the lamp and aiding its commercial sale. The globe fitting in the casing 6 is held from vibration when installed on the car and needs no fastening to the board other than by the holding power of the casing itself.

The lamp when attached to the car makes an excellent parking light, and by its openings 11 to 14 may be seen from both front and rear and from the side of the car.

While I have shown the lamp attached to a running-board of an automobile, it may be used on boats as side lights or on trailers attached to motor trucks, or as dome lights in bodies of cars and otherwise.

I claim as my invention:

1. In a lamp, the combination with an inverted single-piece casing having a top wall and a surrounding marginal wall, the top wall being formed with a light emitting opening and the marginal wall being formed with a plurality of light emitting openings, of a single-piece glass dome fitting within said casing and extending over said openings, an electric lamp located within the dome whereby light rays will be emitted through the openings in the marginal wall in diverging paths in a horizontal plane and through the opening in the top wall in a vertical plane, and a base plate attached to the casing and forming a support for the dome and lamp.

2. A lamp of the character described, comprising a base plate with a terminal socket, an inverted hollow casing on said plate over said socket and having an attaching flange about its lower edge, said casing having a top wall and a surrounding upright marginal wall with light emitting openings in said walls, a glass dome fitting in said casing and extending over said openings, and a gasket clamped between said plate and flange and extending into said casing to provide a seat for said dome.

In testimony whereof he affixes his signature this 18th day of May, 1925.

WILLIAM A. PEARSALL, Jr.